April 13, 1965   W. ROTH ETAL   3,177,552
CONCRETE MAKING MACHINE
Filed Oct. 18, 1962   6 Sheets-Sheet 4

INVENTORS
WILLI ROTH
JOSEF GOETZ
BY: Dicke & Craig
ATTORNEYS

FIG. 10

INVENTORS
WILLI ROTH
JOSEF GOETZ
BY: Dicke & Craig
ATTORNEYS

April 13, 1965     W. ROTH ETAL     3,177,552

CONCRETE MAKING MACHINE

Filed Oct. 18, 1962     6 Sheets-Sheet 6

INVENTORS
WILLI ROTH
JOSEF GOETZ
BY: Dicke & Craig
ATTORNEYS

United States Patent Office 3,177,552
Patented Apr. 13, 1965

3,177,552
CONCRETE MAKING MACHINE
Willi Roth, Hauptstrasse 68, Gaggenau, Baden, Germany, and Josef Goetz, Gaggenau, Baden, Germany; said Goetz assignor to said Roth
Filed Oct. 18, 1962, Ser. No. 231,365
15 Claims. (Cl. 25—41)

The present invention relates to an apparatus for making reinforced concrete plates, and more particularly relates to a movable, continuously operable machine for making reinforced concrete plates of any desired size.

Machines for making reinforced concrete plates are known in the prior art. However, these prior art machines, available to date, have numerous shortcomings and drawbacks which the present invention seeks to eliminate. In particular, the present invention aims at providing a machine of the type described hereinabove which excells not only by simplicity, but also by its versatility as regards the size of the finished product and variations in the characteristics thereof as well as superior quality control obtainable by the use of the machine in accordance with the present invention.

Accordingly, it is an object of the present invention to provide an improved machine for making reinformed concrete plates which eliminates the shortcomings and inadequacies encountered with the prior art systems.

It is another object of the present invention to provide a machine for making reinforced concrete plates which is simple in structure and permits the manufacture of plates of any desired length while maintaining at all times the desired quality control with respect to the finished product.

Still a further object of the present invention resides in the provision of a machine for making reinforced concrete plates which permits continuous operation and simultaneous advancement of the pouring and compacting equipment.

Still a further object of the present invention resides in the provision of a machine for making reinforced concrete plates or slabs which lends itself to automatic control.

Another object of the present invention resides in the provision of a machine for making reinforced concrete plates or slabs which is so constructed and arranged as to assure great uniformity of the product and which enables adaptation of the machine to the particular type of concrete to be poured.

These and other objects, features and advantages of the present invention will become more obvious from the following description when taken in connection with the accompanying drawing which shows, for purposes of illustration only, one embodiment in accordance with the present invention, and wherein—

Referring now to the drawing wherein like reference numerals are used throughout the various views to designate like parts, the frame for the machine in accordance with the present invention is constituted by two parallel side walls or bearer members 1 and 2 interconnected by cross bearer members 3, 4 and 5 of any suitable cross section. The frame is supported on two pairs of rollers 6 and 7 to facilitate advance movement thereof during operation. The wheels 6 and 7 are thereby suitably supported, preferably by the use of bearings, near the front and rear end of the frame. Mounted on the double-beam cross bearer member arrangement 3 (FIGURE 1) disposed near the front end of the frame is a winding drum 10 which is driven by means of a suitable motor, such as an electric motor 9. One or several cables are adapted to be wound on the drum 10 upon rotation thereof by the driving motor 9 whereby the frame or carriage for the machine in accordance with the present invention is displaced in the direction of arrow 8 (FIGURE 1) when since the free end of the cable is fixedly secured at a suitable anchoring device (not shown).

Figure 7:
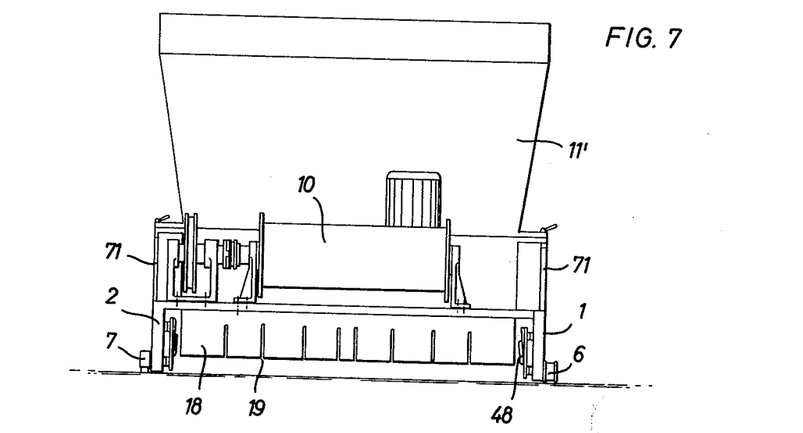
FIGURE 7 is an end elevational view of the machine in accordance with the present invention, taken in the direction of arrow A in FIGURE 2 or arrow A' in FIGURE 10.

A plurality of silo assemblies, namely three silo assemblies generally designated by reference numerals 11, 12 and 13 (FIGURE 1) are disposed in the illustrated embodiment to the rear of the motor 9 as seen in the normal direction of forward movement of the machine. Concrete of the same or different composition may be fed or supplied to the silos 11, 12 and 13 in any suitable manner. The silo assemblies 11, 12 and 13 consist of a main silo part 11', 12' and 13' of conventional shape and of corresponding base silo portions 14, 15 and 16 which are of substantially rectangular cross section extending over the entire width of the machine (FIGURE 2). The main silo parts 11', 12' and 13' are detachably connected with a respective base portion 14, 15 and 16 by any appropriate connecting means such as tommy screws 17 to form the three unitary silo assemblies 11, 12 and 13. Additionally, the silo assemblies 11, 12 and 13 are elastically supported on the side walls 1 and 2 of the machine in any suitable manner, for example, by the interposition of elastically supported uprights 71 (FIGURE 7) provided with elastic cushions (not shown).

Figure 11:
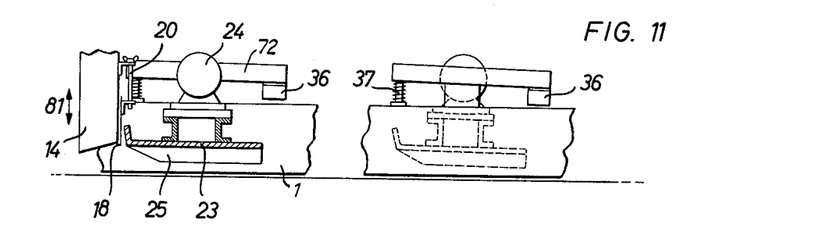
FIGURE 11 is a partial cross sectional view taken along line XI—XI of FIGURE 3 illustrating certain details of the machine in accordance with the present invention.

In order to determine the correct height of the respective concrete layer, there is associated with each silo base portion a wiper arrangement adapted to be adjusted in the height thereof. To that end, the base portion 14 of the silo assembly 11 is provided with a wiper plate 18 (FIGURES 1, 7 and 11) adapted to be adjusted vertically and provided with a plurality of slots 19 (FIGURE 7) corresponding in number to the transport reinforcements 100 and 101 in the form of, for instance, wire rods or the like. The height of the wiper plate 18 may be adjusted by any suitable means such as spindle 20 whereby, in actual construction, two spindles may be provided near the two outer ends of the plate 18 which are adapted to be adjusted by means of a transversely extending spindle having a handwheel projecting laterally beyond the contours of the machine and meshingly engaging by suitable bevel gears with the spindle 20.

Figure 1:
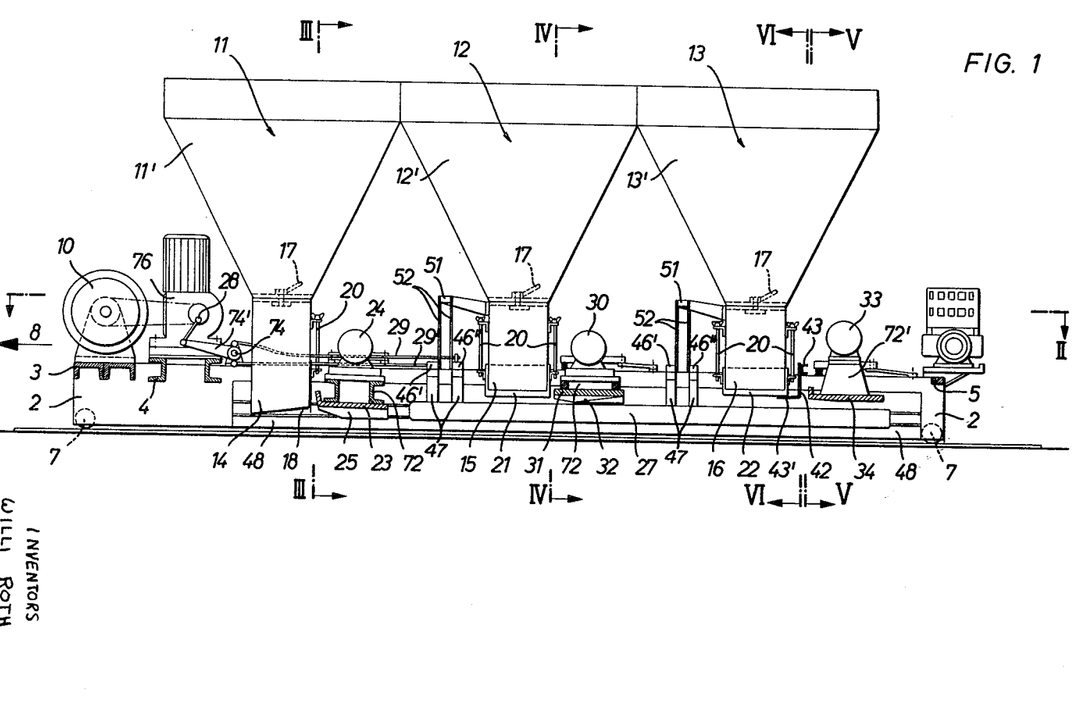
FIGURE 1 is a cross sectional view of a machine for making reinforced concrete plates in accordance with the present invention, taken along line I—I of FIGURE 2.
Figure 2:
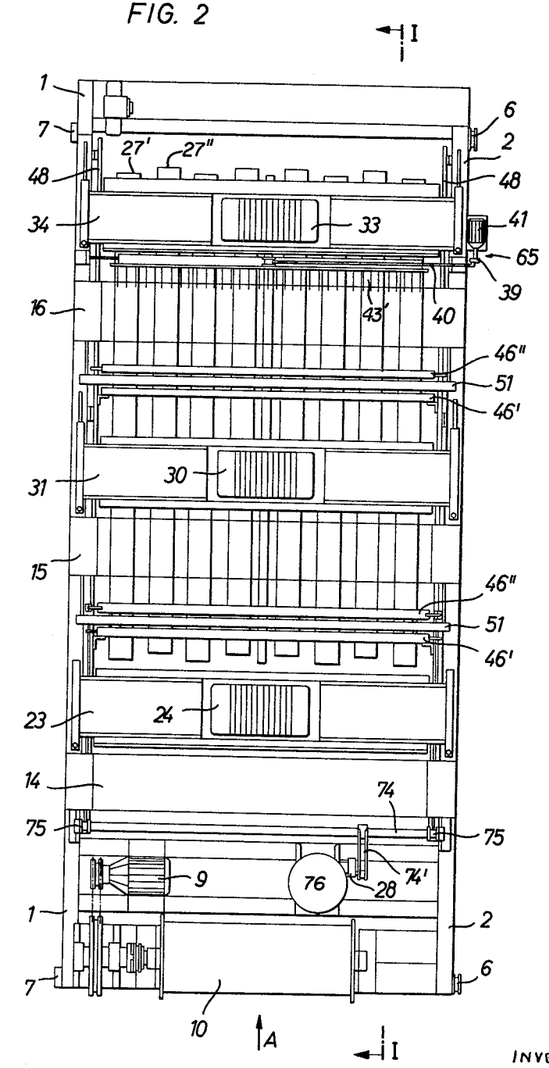
FIGURE 2 is a cross sectional view, in a horizontal plane, of the machine shown in FIGURE 1 and taken along line II—II of FIGURE 1.
Figure 12:
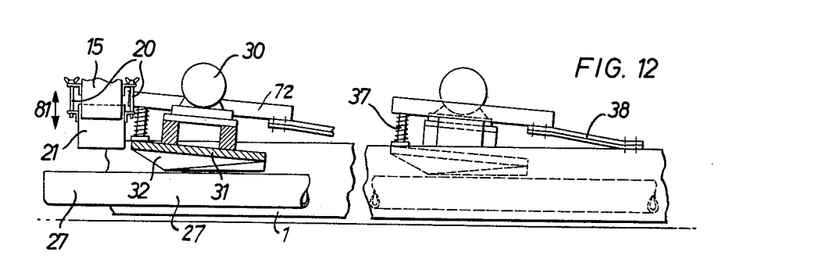
FIGURE 12 is a partial cross sectional view, similar to FIGURE 11, taken along line XII—XII of FIGURE 4 and illustrating also certain other details of the machine in accordance with the present invention.
Figure 13:
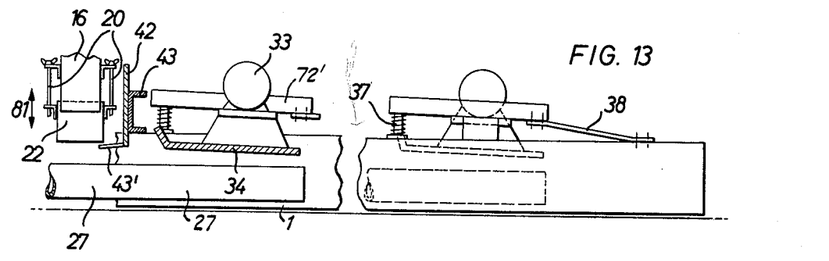
FIGURE 13 is a partial cross sectional view, on an enlarged scale, taken along line XIII—XIII of FIGURE 5 and illustrating still further details in accordance with the present invention.

The wiper arrangements coordinated to the silo base portions 15 and 16, which are also adapted to be adjusted in the height thereof, are of box-shaped construction indicated by reference numerals 21 and 22 in FIGURES 1, 12 and 13. The box-shaped wiper arrangements 21 and 22 may also be provided with spindles 20 and may be adjusted in the height thereof, in a manner similar to the height adjustment described for wiper plate 18. By the use of such height adjusting mechanisms, the wiper arrangements 18, 21 and 22 may be adjusted in the vertical direction indicated in FIGURES 11, 12 and 13 by arrows 81.

Figure 3:
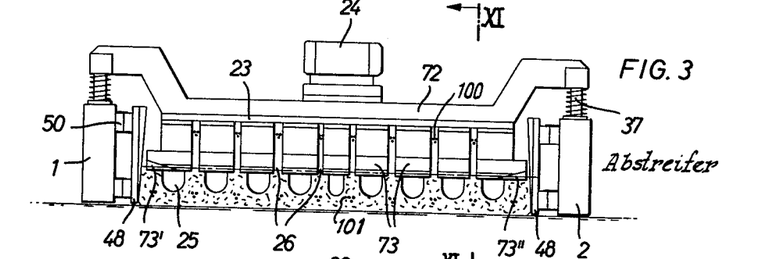
FIGURE 3 is a cross sectional view, on an enlarged scale, taken along line III—III of FIGURE 1.
Figure 4:
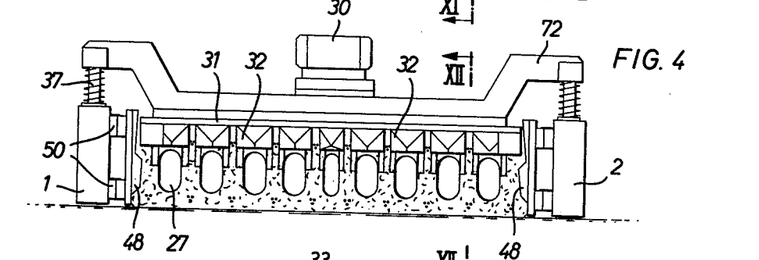
FIGURE 4 is a cross sectional view, similar to FIGURE 3, taken along line IV—IV of FIGURE 1.
Figure 5:
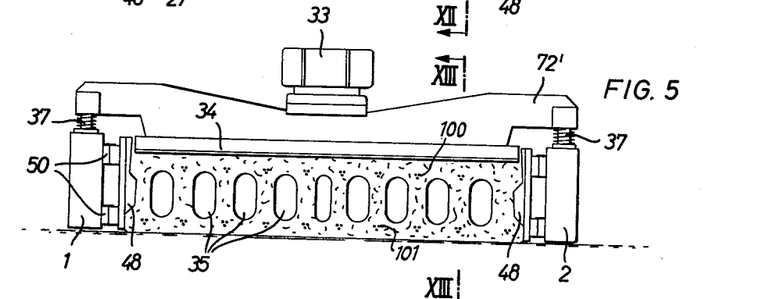
FIGURE 5 is a cross sectional view, similar to FIGURES 3 and 4, taken along line V—V of FIGURE 1.

In order to compact the concrete as well as possible, it is appropriate to subject the poured concrete to vibrations applied by a suitable loading member on the surface thereof because the concrete is transposed thereby into the thixotropic condition. For that purpose, an applied load vibrator is coordinated to each silo assembly. More particularly, the vibrator plate 23 coordinated to the first silo stage (FIGURES 1 and 3) is operatively connected, by way of the transverse bridge-like structure 72 to the vibrator 24, suitable bolting being used to interconnect the vibrator 24 with the bridge-like structure 72 and the bridge-like structure 72 with the vibrator plate 23. The concrete supplied by slio assembly 11 is thereby compacted by the applied load vibrator plate 23. By the provision of suitably contoured body elements 73, ducts 25 are formed within the concrete at this stage of the machine. The vibrator plate assembly 23, 73 is also provided with slots 26, corresponding to the position of the transport reinforcement, to receive therein the reinforcing rods or wires 100 and 101. Both the laterally outermost elements 73 are provided at 73' and 73" with bevelled edges so as to assure a good filling of the mold along the sides thereof.

A plurality of core members 27, corresponding in number and size to the grooves 25 formed by the first vibrator assembly 24, 72, 23, 73, engage in the ducts 25. The core members 27 consists of two sets of core members 27' and 27" which are reciprocated in mutually opposite directions in such a manner that the one set of core members 27' moves in the forward direction while the other set of core members 27" moves in the rearward direction and vice versa. To produce the reciprocatory movement of the two sets of core members (FIGURES 1, 2, 4, 5, 12 and 13), two crank rods 29 and 29' disposed one above the other are provided on both sides of the machine which are reciprocated by the connection with a bell crank 28 (FIGURES 1 and 2) driving the rocker arm 74' of rocker arm shaft 74 to which are secured at the two ends thereof lug-type asemblies 75 having diametrically opposite projecting lugs adapted to be connected with respective crank rods 29 and 29'. The lug type assemblies 75 may be of a construction utilizing two half portions suitably clamped over the ends of the shaft by bolts or the like. The free ends of the crank rods 29 and 29' are suitably connected in each instance with transverse bearer members 46' and 46". One set of core members 27' is thereby secured to the transverse bearer members 46' and the other set of core members 27" is suitably secured to the transverse bearer members 46" by any suitable connecting links. As a result of such arrangement, it can be readily seen that the two sets of core members 27' and 27" are reciprocated in opposite directions when the crank or eccentric 28 is driven by the drive unit 76 which, for example, may be a change-speed gear operatively connected by way of a disenageable clutch 77 with the electric motor 9.

The vibrator assembly coordinated to the second silo assembly (FIGURES 1 and 4), comprises a load applied vibrator plate 31 operatively connected with the vibrator 30 by way of the bridge-like structure 72 thereof. The pressure pad-like vibrator elements 32 carried by the vibrator plate 31 thereby achieve a compacting of the concrete on both sides of the core members 27' and 27".

Figure 6:
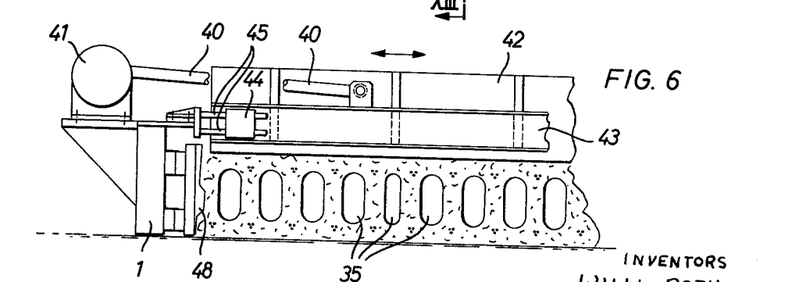
FIGURE 6 is a partial cross sectional view, on an enlarged scale, taken along line VI—VI of FIGURE 1.

Whereas the concrete supplied in the first slio assembly 11 only forms the ducts 25 and the concrete supplied in the second silo assembly 12 at best just covers the core members 27, the concrete supplied by the third silo assembly 13 completely covers the core members 27. The vibrator assembly coordinated to the third silo assembly 13 comprises a vibrator plate 34, again operatively connected with the vibrator 33 by way of the transverse bridge-like structure 72'. The compacting achieved in this third silo stage is such that hollow spaces 35 (FIGURES 5 and 6) are produced within the concrete plate thus poured.

All of the vibrator assemblies are elastically supported on the frame, and more particularly are elastically supported along the outer extremities of the bridge-like structures on the frame side members 1 and 2. For that purpose, coil springs 37 (FIGURES 3, 4 and 5) are provided which are arranged along the forwardly disposed portions of each bridge-like structure. The rearwardly disposed portions of the bridge-like structure are supported, in the first vibrator assembly, illustrated in FIGURE 11, by means of elastic cushions 36. Leaf spirngs 38 are utilized in connection with the second and third vibrator assemblies since these vibrator assemblies have to be supported in a more elastic manner because of the lesser quantity of concrete to be compacted by the second and third stage respectively.

A mechanical distributor installation generally designated by reference numeral 65 is operatively associated with and disposed in front of the last vibrator stage. More particularly, the mechanical distributor installation 65 comprises a motor 41 (FIGURE 2) which drives an eccentric 39 that, in turn, is operatively connected with a reciprocating push rod 40. The motor 41 may be of any suitable construction, for example, a transmission motor to enable change of the output driving speed thereof. Operatively connected with the push rod 40 is a wiper assembly 42 having a plurality of fingers 43' by means of which the wiper extends below the silo base portion 16 and therewith distributes the newly fed concrete. Simultaneously therewith, by reason of the reciprocatory movement in the transvrese direction, the wiper assembly 42 meters the material supply for the vibrator plate 34.

The wiper assembly 42 provided with guide rails 43 is suitably supported on the side frame members 1 and 2 by means of a sliding piece 44 (FIGURE 6) and guide element 45.

Figure 10:
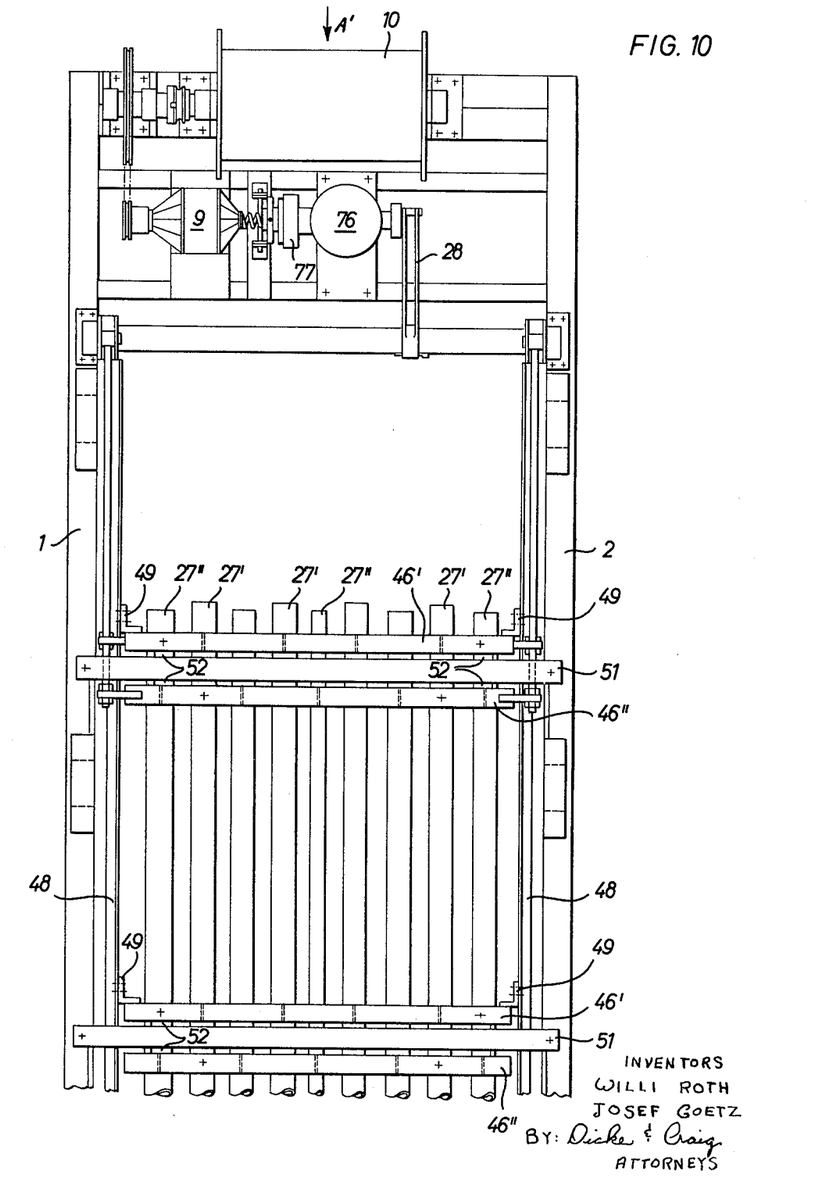
FIGURE 10 is a partial top plan view of the machine in accordance with the present invention, on an enlarged scale, with certain parts removed for clarity's sake.

The drive for the core members 27 which takes place by way of the crank drive 28 and crank rods 29 and 29' over transverse bearer members 46 and 46' from which the core members 27' and 27" are suspended by means of web portions 47, serve simultaneously as drive means for the profile-shaped sectional side shell members 48 forming part of the mold (FIGURES 3 through 6) which are suitably secured by angle brackets 49 (FIGURE 10) to the transverse bearer members 46' and are suitably supported by appropriate sliding bearings 50 at the main frame. The side shell or mold members 48 may thereby by detachably secured so as to enable interchange thereof in case of wear in the course of operation. The sliding bearing 50 may be of any suitable construction and may utilize appropriate roller bearings or needle bearings and/or, a dove-tail type longitudinal guidance in the side frame members 1 and 2. Leaf springs 52 (FIGURES 1 and 10) are arranged at the cross connecting members 51 which support thereon the transverse cross bearer member 46' and 46".

The fingers 43' of the mechanical distributor installation thereby serve to meter the exact amount of material for the last stage of the machine in accordance with the present invention so as to assure a smooth surface of the poured concrete prior to reaching the third vibration stage.

Figure 8:
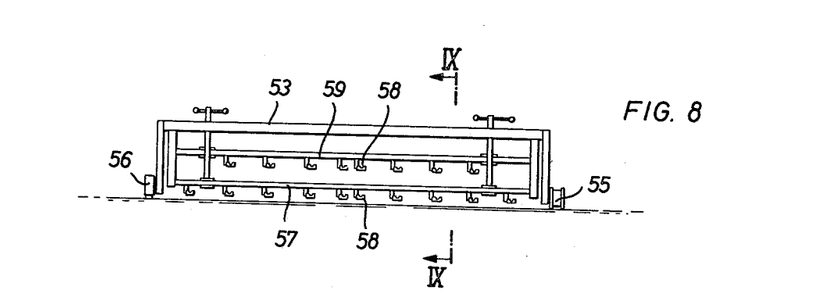
FIGURE 8 is an end elevational view of a wire guide carriage arranged in front of the machine in accordance with the present invention.
Figure 9:
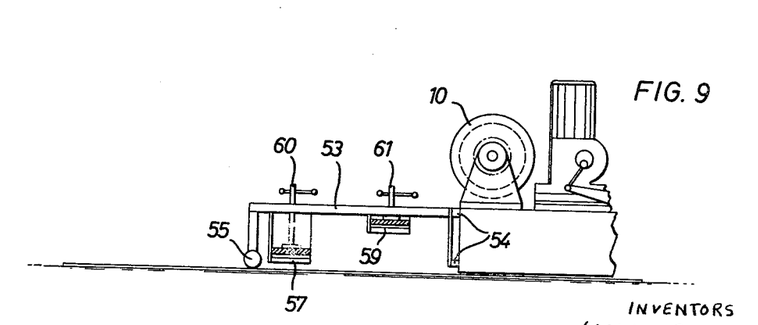
FIGURE 9 is a cross sectional view of the wire guide carriage in accordance with the present invention, taken along line IX—IX of FIGURE 8.

Referring to FIGURES 8 and 9, a wire guide carriage is arranged in front of the machine, and comprises a carriage frame 53 which is supoprted on wheels 55 and 56 in front thereof and is suitably supported at the rear thereof, by means of appropriate cushioning elements 54, at the front end of the machine frame. The guide carriage serves for guiding the reinforcing wires or rods. The carriage frame includes a transverse bearer 57 provided with individual wire guide pieces 58 and serves for the lower reinforcing layer of wires or rods whereas the transverse bearer 59 provided with the guide pieces 58 serves for the accommodation of the upper reinforcing layer of wires or rods. The height of the transverse bearers 57 and 59 may be suitably adjusted by means of spindles 60 and 61, respectively.

Since the operation in accordance with the present invention is believed obvious, detailed description is dispensed with herein. It suffices, as pointed out hereinabove, that the entire machine is moved forwardly upon rotation of the winding drum 10 whereby the cable or cables fixedly secured to an anchoring place at the free end thereof are wound on the drum 10 thereby simultaneously moving the machine relative to the stationary anchoring of the cable. During such movement, concrete is supplied continuously through the silo assemblies 11, 12 and 13 whereby the vibrator assemblies and mechanical charging installation assure a good distribution and compacting of the concrete for uniformity of strength and contour.

Reinforcing wires, rods or the like are thereby strung along the path traversed by the machine whereby the reinforcing wires are guided by means of wire supports 58 provided on the transverse bearer members 57 and 59 of the wire guide carriage.

While we have shown and described one embodiment in accordance with the present invention, it is understood that the same is not limited thereto, but is susceptible of many changes and modifications within the spirit and scope thereof and we therefore do not wish to be limited to the details shown and described herein, but intend to cover all such changes and modifications as are encompassed by the scope of the appended claim.

We claim:

1. A continuously operable machine for making reinforced concrete plates of any desired size, comprising
machine frame means including a plurality of interconnected substantially longitudinally-extending side frame members and substantially transversely-extending connecting frame members,
wheels rotatably supporting said frame means, advancing means on said frame means for advancing said machine at a predetermined controllable speed including a winding drum for winding thereon a cable which, during operation, is fixedly anchored at the free end thereof, and an electric motor operatively connected with said winding drum,
a plurality of silo assemblies spaced in the longitudinal direction of said machine for supplying the concrete,
each silo assembly including a main portion supported on a base portion and a wiper assembly coordinated to a respective base portion having means to adjust the height thereof, and means for elastically supporting a respective silo assembly on said frame means,
at least the first wiper assembly, as seen in the normal advancing direction of the machine, having a wiper plate and at least the two last wiper assemblies having a box-shaped wiper structure,
a plurality of vibrator assemblies, one vibrator assembly each coordinated to and disposed to the rear of a corresponding silo assembly,
each vibrator assembly including a vibrator, a vibrator plate structure supporting thereon a plurality of body elements, and means including a bridge-like structure operatively connecting a vibrator with a respective vibrator plate structure,
elastic means for elastically supporting the bridge-like structure of a respective vibrator assembly on said frame means,
said vibrator plate structures being provided with openings to receive therein the reinforcing wires and being so constructed and arranged as to enable the formation within the concrete plate of a plurality of ducts by the use of core members,
a plurality of core members operatively associated with at least some of the silo assemblies other than the first silo assembly including two sets of mutually oppositely reciprocating core members,
means for reciprocating the two sets of core members in opposite directions including bell-crank drive means operatively connected with said motor, a plurality of laterally disposed longitudinally-extending connecting rods operatively connected at one end thereof with said bellcrank drive means and at the other end with transversely-extending bearer means supporting thereon said core members,
side wall means forming part of the mold, means operatively connecting said side wall means with one of said transverse bearer means to reciprocate the wall means in unison with a respective set of core members, and bearing means for supporting said wall means at said side frame members,
a mechanical distributing installation operatively associated with the last silo assembly for metering the concrete supplied thereby including wiper means having a plurality of finger portions extending below the base portion of the last silo assembly, and drive and guide means for reciprocating said wiper means in the transverse direction and guiding the same during such reciprocating movements,
and a wire assembly for supporting and guiding the reinforcing wires including carriage means having a frame, wheels on said last-mentioned frame, means elastically supporting said frame at the front of said machine frame means, and a plurality of vertically adjustable wire guide pieces supported on said frame.

2. A continuously operable machine for making reinforced concrete plates of any desired size, comprising
machine frame means including a plurality of interconnected substantially longitudinally-extending side frame members and substantially transversely-extending frame connecting members,
advancing means on said frame means for advancing said machine,
a plurality of silo assemblies spaced in the longitudinal direction of said machine for feeding concrete,
each silo assembly including a main portion supported on a base portion, and a wiper assembly coordinated to a respective base portion having means to adjust the height thereof,
a plurality of vibrator assemblies, one vibrator assembly each coordinated to and disposed to the rear of a corresponding silo assembly,
each vibrator assembly including a vibrator, a vibrator plate structure, and means operatively connecting a vibrator with a respective vibrator plate structure,
a plurality of core members operatively associated with at least some of the silo assemblies including two sets of mutually oppositely reciprocating core members,
means for reciprocating the two sets of core members in opposite directions including drive means, a plurality of connecting links operatively connecting said drive means with transversely-extending bearer means supporting thereon said core members, and a mechanical distributing installation operatively associated with the last silo assembly for metering the concrete supplied thereby including wiper means having a plurality of finger portions extending below the base portion of the last silo assembly, and drive and guide means for reciprocating said wiper means in the transverse direction and guiding the same during such reciprocating movements.

3. A continuously operable machine for making reinforced concrete plates of any desired size, comprising
machine frame means including a plurality of interconnected substantially longitudinally-extending side frame members and substantially transversely-extending connecting frame members,
wheels rotatably supporting said frame means,
advancing means on said frame means for advancing said machine at a predetermined speed including a winding drum for winding thereon a cable which, during operation, is fixedly anchored at the free end thereof, and a motor operatively connected with said winding drum,
a plurality of silo assemblies spaced in the longitudinal direction of said machine for supplying the concrete,
each silo assembly including a main portion supported on a base portion and a wiper assembly coordinated to a respective base portion having means to adjust the height thereof,
at least the first wiper assembly, as seen in the normal advancing direction of the machine, having a wiper plate and at least the two last wiper assemblies having a box-shaped wiper structure,
a plurality of vibrator assemblies, one vibrator assembly each coordinated to and disposed to the rear of a corresponding silo assembly,
each vibrator assembly including a vibrator, a vibrator plate structure supporting thereon a plurality of body elements, and means operatively connecting a vibrator with a respective vibrator plate structure,
elastic means for elastically supporting the bridge-like structure of a respective vibrator assembly on said frame means,
said vibrator plate structures being provided with openings to receive therein the reinforcing wires and being so constructed and arranged as to enable the formation within the concrete plate of a plurality of ducts by the use of core members,
a plurality of core members operatively associated with at least some of the silo assemblies other than the first silo assembly including at least two sets of mutually oppositely reciprocating core members,
means for reciprocating the sets of core members in opposite directions including drive means, a plurality of laterally disposed longitudinally-extending connecting rods operatively connected at one end thereof with said drive means and at the other end with transversely-extending bearer means supporting thereon said core members,
side wall means forming part of the mold, means operatively connecting said side wall means with one of said transverse bearer means to reciprocate the wall means in unison with a respective set of core members, and bearing means for supporting said wall means at said side frame members,
a mechanical distributing installation operatively associated with the last silo assembly for metering the concrete supplied thereby including wiper means having a plurality of finger portions extending below the base portion of the last silo assembly, and drive means for reciprocating said wiper means in the transverse direction,
and a wire assembly for supporting and guiding the reinforcing wires including carriage means having a frame, wheels on said last-mentioned frame, and a plurality of vertically adjustable wire guide pieces supported on said frame.

4. A continuously operable machine for making reinforced concrete plates of any desired size, comprising
machine frame means including a plurality of interconnected substantially longitudinally-extending side frame members and substantially transversely-extending frame connecting members,
advancing means on said frame means for advancing said machine,
a plurality of silo assemblies spaced in the longitudinal direction of said machine for feeding concrete,
each silo assembly including a main portion supported on a base portion, and a wiper assembly coordinated to a respective base portion having means to adjust the height thereof,
a plurality of vibrator assemblies, one vibrator assembly each coordinated to and disposed to the rear of a corresponding silo assembly,
each vibrator assembly including a vibrator, a vibrator plate structure, and means operatively connecting a vibrator with a respective vibrator plate structure,
said vibrator plate structures being provided with openings to receive therein the reinforcing wires and being so constructed and arranged as to enable the formation within the concrete plate of a plurality of ducts by the use of core members,
a plurality of core members operatively associated with at least some of the silo assemblies including two sets of mutually oppositely reciprocating core members,
means for reciprocating the two sets of core members in opposite directions including drive means, a plurality of connecting links operatively connecting said drive means with transversely-extending bearer means supporting thereon said core members,
and a mechanical distributing installation operatively associated with the last silo assembly for metering the concrete supplied thereby including wiper means having a plurality of finger portions extending below the base portion of the last silo assembly, and drive and guide means for reciprocating said wiper means in the transverse direction and guiding the same during such reciprocating movements.

5. A continuously operable machine for making reinforced concrete plates of any desired size, comprising
machine frame means including a plurality of interconnected substantially longitudinally-extending side frame members and substantially transversely-extending frame connecting members,
wheels rotatably supporting said frame means,
advancing means on said frame means for advancing said machine including a winding drum for winding thereon the cable which, during operation, is fixedly anchored at the free end thereof, and a motor operatively connected with said winding drum,
a plurality of silo assemblies spaced in the longitudinal direction of said machine for feeding concrete,
each silo assembly including a main portion supported on a base portion, and a wiper assembly coordinated to a respective base portion having means to adjust the height thereof,
a plurality of vibrator assemblies, one vibrator assembly each coordinated to and disposed to the rear of a corresponding silo assembly,
each vibrator assembly including a vibrator, a vibrator plate structure, and means operatively connecting a vibrator with a respective vibrator plate structure,
a plurality of core members operatively associated with at least some of the silo assemblies including two sets of mutually oppositely reciprocating core members,
means for reciprocating the two sets of core members in opposite directions including drive means, a plurality of connecting links operatively connecting said drive means with transversely-extending bearer means supporting thereon said core members,
and a mechanical distributing installation operatively associated with the last silo assembly for metering the concrete supplied thereby including wiper means having a plurality of finger portions extending below the base portion of the last silo assembly, and drive and guide means for reciprocating said wiper means in the transverse direction and guiding the same during such reciprocating movements.

6. A continuously operable machine for making reinforced concrete plates of any desired size, comprising machine frame means including a plurality of interconnected substantially longitudinally-extending side frame members and substantially transversely-extending frame connecting members, advancing means on said frame means for advancing said machine, a plurality of silo assemblies spaced in the longitudinal direction of said machine for feeding concrete, each silo assembly including a main portion supported on a base portion, and a wiper assembly coordinated to a respective base portion having means to adjust the height thereof, at least the first wiper assembly, as seen in the normal advancing direction of the machine, having a wiper plate and at least the two last wiper assemblies having a box-shaped wiper structure, a plurality of vibrator assemblies, one vibrator assembly each coordinated to and disposed to the rear of a corresponding silo assembly, each vibrator assembly including a vibrator, a vibrator plate structure, and means operatively connecting a vibrator with a respective vibrator plate structure, a plurality of core members operatively associated with at least some of the silo assemblies including two sets of mutually oppositely reciprocating core members, means for reciprocating the two sets of core members in opposite directions including drive means, a plurality of connecting links operatively connecting said drive means with transversely-extending bearer means supporting thereon said core members, and a mechanical distributing installation operatively associated with the last silo assembly for metering the concrete supplied thereby including wiper means having a plurality of finger portions extending below the base portion of the last silo assembly, and drive and guide means for reciprocating said wiper means in the transverse direction and guiding the same during such reciprocating movements.

7. A continuously operable machine for making reinforced concrete plates of any desired size, comprising machine frame means including a plurality of interconnected substantially longitudinally-extending side frame members and substantially transversely-extending frame members, advancing means on said frame means for advancing said machine at a predetermined speed, a plurality of silo assemblies spaced in the longitudinal direction of said machine for feeding concrete, each silo assembly including a main portion supported on a base portion and a wiper assembly coordinated to a respective base portion, a plurality of vibrator assemblies, one vibrator assembly each coordinated to and disposed to the rear of a corresponding silo assembly, each vibrator assembly including a vibrator, a vibrator plate structure, and means operatively connecting a vibrator with a respective vibrator plate structure, a plurality of core members operatively associated with at least some of the silo assemblies other than the first silo assembly including two sets of mutually oppositely reciprocating core members, means for reciprocating the two sets of core members in opposite directions including drive means and means operatively connecting said drive means with transversely-extending bearer means supporting thereon said core members, side wall means forming part of the mold, means operatively connecting said side wall means with one of said transverse bearer means to reciprocate the wall means in unison with the respective set of core members, and bearing means for supporting said wall means at said side frame members, a mechanical distributing installation operatively associated with at least one of said silo assemblies for metering the concrete supplied thereby including wiper means having a plurality of finger portions extending below the base portion thereof, and drive means for reciprocating said wiper means in the transverse direction, and a wire assembly for supporting and guiding the reinforcing wires including carriage means having a frame, means supporting said frame at the front of said machine frame means, and a plurality of wire guide pieces supported on said frame.

8. A continuously operable machine for making reinforced concrete plates of any desired size, comprising machine frame means including a plurality of interconnected substantially longitudinally-extending side frame members and substantially transversely-extending frame members, advancing means on said frame means for advancing said machine at a predetermined speed, a plurality of silo assemblies spaced in the longitudinal direction of said machine for feeding concrete, each silo assembly including a main portion supported on a base portion and a wiper assembly coordinated to a respective base portion, a plurality of vibrator assemblies, one vibrator assembly each coordinated to and disposed to the rear of a corresponding silo assembly, each vibrator assembly including a vibrator, a vibrator plate structure, and means operatively connecting a vibrator with a respective vibrator plate structure, a plurality of core members operatively associated with at least some of the silo assemblies other than the first silo assembly including two sets of mutually oppositely reciprocating core members, means for reciprocating the two sets of core members in opposite directions including drive means and means operatively connecting said drive means with transversely-extending bearer means supporting thereon said core members, side wall means forming part of the mold, means operatively connecting said side wall means with one of said transverse bearer means to reciprocate the wall means in unison with the respective set of core members, and bearing means for supporting said wall means at said side frame members, a mechanical distributing installation operatively associated with at least one of said silo assemblies for metering the concrete supplied thereby including wiper means having a plurality of finger portions extending below the base portion thereof, and drive means for reciprocating said wiper means in the transverse direction.

9. A continuously operable machine for making reinforced concrete plates of any desired size, comprising:

machine frame means including a plurality of interconnected substantially longitudinally-extending side frame members and substantially transversely-extending frame members, advancing means on said frame means for advancing said machine at a predetermined speed, a plurality of silo assemblies spaced in the longitudinal direction of said machine for feeding concrete, each silo assembly including a main portion supported on a base portion, and a wiper assembly coordinated to a respective base portion, a plurality of vibrator assemblies, one vibrator assembly each coordinated to and disposed to the rear of a corresponding silo assembly, each vibrator assembly including a vibrator, a vibrator plate structure, and means operatively connecting a vibrator with a respective vibrator plate structure, a plurality of core members operatively associated with at least some of the silo assemblies other than the first silo assembly including two sets of mutually oppositely reciprocating core members, means for reciprocating the two sets of core members in opposite directions including drive means and means operatively connecting said drive means with transversely-extending bearer means supporting thereon said core members, said wall means forming part of the mold, means operatively connecting said side wall means with one of said transverse bearer means to reciprocate the wall means in unison with the respective set of core members, and bearing means for supporting said wall means at said side frame members, and a wire assembly for supporting and guiding the reinforcing wires including carriage means having a frame, means supporting said frame at the front of said machine frame means, and a plurality of wire guide pieces supported on said frame.

10. A continuously operable machine for making reinforced concrete plates of any desired size, comprising:

machine frame means including plurality of interconnected substantially longitudinally extending side frame members and substantially transversely extending frame connecting members, advancing means on said frame means for advancing said machine, a plurality of silo assemblies spaced in the longitudinal direction of said machine for feeding concrete, each silo assembly including a base portion, and a wiper assembly coordinated to a respective base portion having means to adjust the height thereof, a plurality of vibrator assemblies, one vibrator assembly each coordinated to and disposed to the rear of a corresponding silo assembly, a plurality of core members operatively associated with at least some of the silo assemblies including two interdigitated sets of mutually oppositely reciprocating core members, and means for reciprocating the two sets of core members in opposite longitudinal directions of the machine.

11. A continuously operable machine for making reinforced concrete plates of any desired size, comprising:

machine frame means icluding a plurality of interconnected substantially longitudinally extending side frame members and substantially transversely extending frame connecting members, advancing means on said frame means for advancing said machine, a plurality of silo assemblies spaced in the longitudinal direction of said machine for feeding concrete.

each silo assembly including a base portion, and a wiper assembly coordinated to a respective base portion having means to adjust the height thereof, a plurality of vibrator assemblies, one vibrator assembly each coordinated to and disposed to the rear of a corresponding silo assembly, a plurality of core members operatively associated with at least some of the silo assemblies including two interdigitated sets of mutually oppositely reciprocating core members, and means for reciprocating the two sets of core members in opposite longitudinal directions of the machine.

at least the first wiper assembly, as seen in the normal advancing direction of the machine, having a wiper plate and at least the two last wiper assemblies having a box-shaped wiper structure.

12. A continuously operable machine for making reinforced concrete plates of any desired size, comprising:

machine frame means including a plurality of interconnected substantially longitudinally extending side frame members and substantially transversely extending frame connecting members, advancing means on said frame means for advancing said machine, a plurality of silo assemblies spaced in the longitudinal direction of said machine for feeding concrete, each silo assembly including a base portion, and a wiper assembly coordinated to a respective base portion having means to adjust the height thereof, a plurality of vibrator assemblies, one vibrator assembly each coordinated to and disposed to the rear of a corresponding silo assembly, a plurality of core members operatively associated with at least some of the silo assemblies including two interdigitated sets of mutually oppositely reciprocating core members, and means for reciprocating the two sets of core members in opposite longitudinal directions of the machine, at least one of said vibrator assemblies including a vibrator plate structure contoured to extend on either side of said core members.

13. A continuosuly operable machine for making reinforced concrete plates of any desired size, comprising:

machine frame means including a plurality of interconnected substantially longitudinally extending side frame members and substantially transversely extending from connecting members, advancing means on said frame means for advancing said machine, a plurality of silo assemblies spaced in the longitudinal direction of said machine for feeding concrete, each silo assembly including a base portion, and a wiper assembly coordinated to a respective base portion having means to adjust the height thereof, a plurality of vibrator assemblies, one vibrator assembly each coordinated to and disposed to the rear of a corresponding silo assembly, a plurality of core members operatively associated with at least some of the silo assemblies including two interdigitated sets of mutually oppositely reciprocating core members, and means for reciprocating the two sets of core members in opposite longitudinal directions of the machine, said vibrator assemblies each consisting of a vibrator plate structure, a vibrator and a bridge-like support structure operatively connecting a vibrator to a respective vibrator plate structure, and elastic means for electrically supporting said bridge-like support structure of a respective vibrator assembly on said frame means.

14. A continuously operable machine for making reinforced concrete plates of any desired size, comprising:

machine frame means including a plurality of interconnected substantially longitudinally extending side frame members and substantially transversely extending frame connecting members, advancing means on said frame means for advancing said machine, a plurality of silo assemblies spaced in the longitudinal direction of said machine for feeding concrete, each silo assembly including a base portion, and a wiper assembly coordinated to a respective base portion having means to adjust the height thereof, a plurality of vibrator assemblies, one vibrator assembly each coordinated to and disposed to the rear of a corresponding silo assembly, a plurality of core members operatively associated with at least some of the silo assemblies including two interdigitated sets of mutually oppositely reciprocating core members, and means for reciprocating the two sets of core members in opposite longitudinal directions of the machine, at least the first wiper assembly, as seen in the normal advancing direction of the machine, having a wiper plate and at least the two last wiper assemblies having a box-shaped wiper structure, a mechanical distributing installation operatively associated with the last silo assembly of accurately metering the concrete supplied thereby.

15. A continuously operable machine for making reinforced concrete plates of any desired size, comprising:

machine frame means including a plurality of interconnected substantially longitudinally extending side frame members and substantially transversely extending frame connecting members, advancing means on said frame means for advancing said machine, a plurality of silo assemblies spaced in the longitudinal direction of said machine for feeding concrete, each silo assembly including a base portion, and a wiper assembly coordinated to a respective base portion having means to adjust the height thereof, a plurality of vibrator assemblies, one vibrator assembly each coordinated to and disposed to the rear of a corresponding silo assembly, a plurality of core members operatively associated with at least some of the silo assemblies including two interdigitated sets of mutually oppositely reciprocating members, and means for reciprocating the two sets of core members in opposite longitudinal directions of the machine, at least the first wiper assembly, as seen in the normal advancing direction of the machine, having a wiper plate and at least the two last wiper assemblies having a box-shaped wiper structure, at least one of said vibrator assemblies including a vibrator plates structure contoured to extend on either side of said core members, said vibrator assemblies each consisting of a vibrator plate structure, a vibrator and a bridge-like support structure operatively connecting a vibrator to a respective vibrator plate structure, and elastic means for elastically supporting said bridge-like support structure of a respective vibrator assembly on said frame means, a mechanical distributing installation operatively associated with the last silo assembly for accurately metering the concrete supplied thereby.

References Cited by the Examiner

UNITED STATES PATENTS

| | | | |
|---|---|---|---|
| 1,920,716 | 8/33 | Schafer. | |
| 2,531,574 | 11/50 | Lang | 25—43 |
| 2,938,255 | 5/60 | Oakden | 25—32 |
| 2,962,785 | 12/60 | Young | 25—41 |

FOREIGN PATENTS 500,557    7/51    Belgium.

OTHER REFERENCES

Roth, German application 1,118,684, printed Nov. 30, 1961, Kl 80a 49.

Schafer, German application 1,036,742, printed Aug. 14, 1958, Kl 80a 51.

Schafer, German application 1,036,743, printed Aug. 14, 1958, Kl 80a 51.

Weiler, German application 1,084,186, printed June 23, 1960, Kl 80a 49.

WILLIAM J. STEPHENSON, *Primary Examiner.*

ROBERT F. WHITE, *Examiner.*